N. Platt.
Mower.
Nº 6517  Patented Jun. 12, 1849
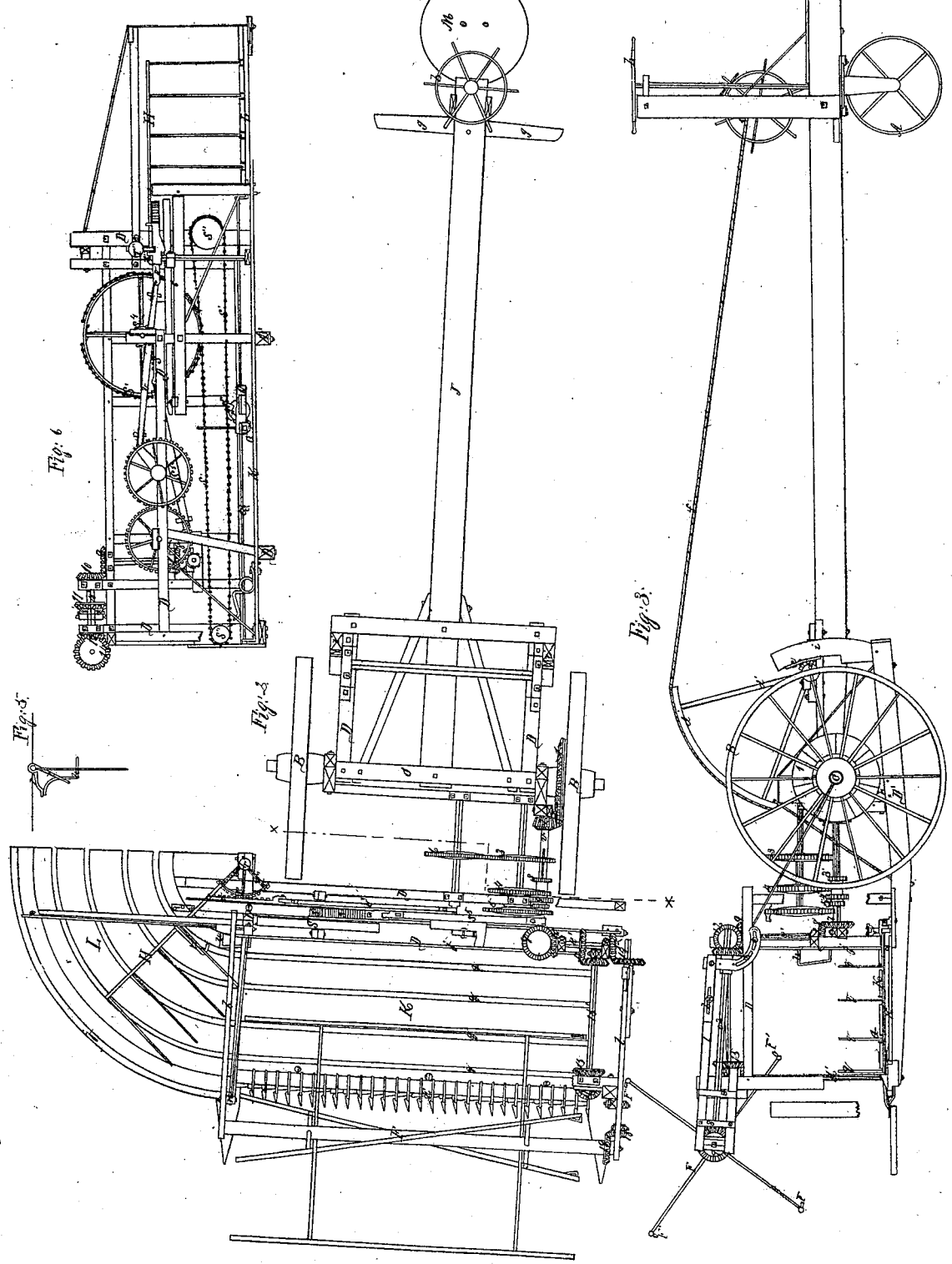

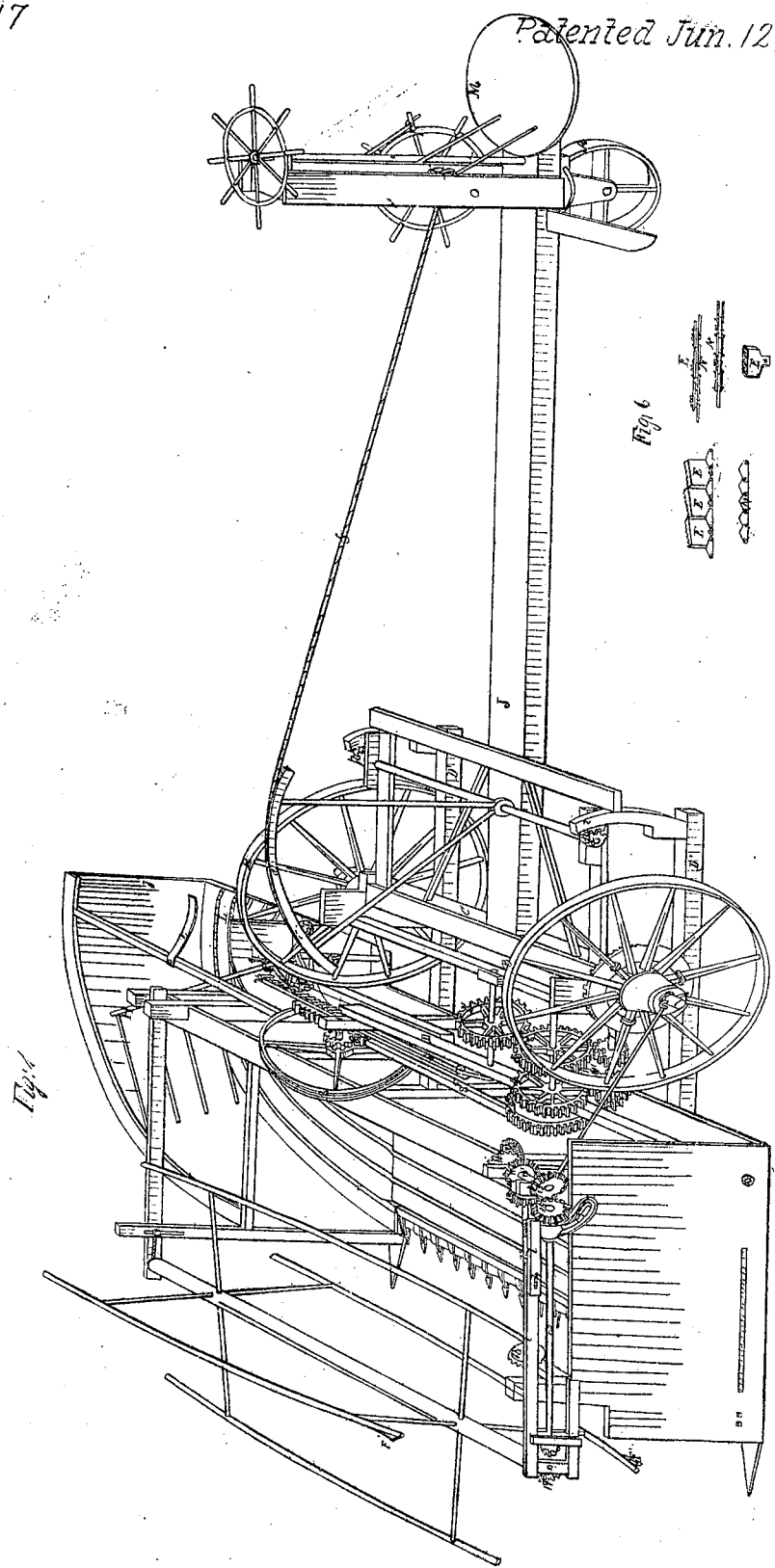

UNITED STATES PATENT OFFICE.

NELSON PLATT, OF OTTAWA, ILLINOIS.

IMPROVEMENT IN HARVESTERS.

Specification forming part of Letters Patent No. 6,517, dated June 12, 1849.

*To all whom it may concern:*

Be it known that I, NELSON PLATT, of Ottawa, in the county of La Salle and State of Illinois, have invented certain new and useful Improvements in Machines for Cutting and Raking Grain or Grass by Animal-Power, of which the following is a full and exact description, reference being had to the annexed drawings of the same, making part of this specification, in which—

Figure 1 is a perspective view of the apparatus, showing its several parts in connection and ready for operation. Fig. 2 is a top view. Fig. 3 is a side elevation, a portion of the frame being removed to expose the rake and sickle. Fig. 4 is a sectional view taken through the line $x\,x$ of Fig. 2. Fig. 5 is a view of the stop and catches by which the auxiliary rake is turned down to take the sheaf of grain from the first or principal rake detached from the machine. Fig. 6 is a view of a section of the chain and cutters in various positions.

The same letters indicate the same parts in all the figures.

The machine, as represented in the accompanying drawings, is mounted upon three wheels, the hindermost of which, A, is hung upon a pivot or vertical shaft, $a$, which is turned by the attendant, to govern the course of the machine when in motion, by means of a steering-wheel, $b$, secured upon its upper end. The other or front wheels, B, are secured in the usual manner upon the opposite ends of an axle, C, upon which the frame D is suspended, together with its platform, the cutters E, reel F, first rake, G, and second rake, H, with the mechanism required to operate them severally. The frame D is raised and lowered upon the axle C, which acts as its fulcrum for the purpose of elevating and depressing the cutters to adapt them to cutting off the grain at different heights from the ground by means of the segment-racks $c$ and pinions $d$, the former attached to the back end of the frame D, the latter to the beam J. The pinions $d$ are turned by the quadrant lever or sector $d'$, and the latter is moved by a rope or chain, $f$, which is drawn up and let down by the windlass $i$, to which it is attached. The windlass is provided with a pawl or stop to hold it at any position it may be necessary to place it in in the adjustment of the cutters, and for the purpose of raising the cutters up to be out of the way and pass over obstructions with which it might otherwise come into contact in moving along the road from one place to another.

The horses or other animals employed to propel this machine are harnessed to a whiffletree, $g$, attached to the beam J, on either side of which they travel. The beam J also connects the wheels A and B B, and supports the steering apparatus, and likewise supports the man who guides the machine and drives the team.

The swing-frame D consists of two principal beams, D' D', suspended to the axle C by arms $h\,h$, projecting from their upper side, and braced so as to give them the requisite firmness and strength. Upon the rear end of these beams the studs $i\,i$ are erected, to which the racks $c\,c$ are secured. Upon the front end of these beams D' D' the double platform K is placed, in which the endless-chain cutter E and the first or principal rake are secured and operate, and also the side platform, L, upon which the sheaf is conveyed by the second rake. Upon these platforms are placed the frame for supporting the reel F and the wheels and shafts which operate it, also the frame for supporting the wheels, shafts, &c., which operate the rakes, with the guards or partitions $j$, to prevent the grain both from falling off the platform and also from getting entangled in the machinery.

The object for which I use the reel F is the same as that for which it is used by others—namely, pressing the grain against the cutters; and as it requires to be elevated and set back for long and depressed and moved forward for short grain, in order that they may be respectively cut to the best advantage, I have made provision for varying its adjustment to any required position by making slots $b$ in the horizontal bars $l$, to which the bearings in which the axis of the reel rests are secured, and also by making slots $m$ in the posts $n$ for the bolts to pass through which support the horizontal bars.

The horizontal shaft $o^2$, upon which the wheels are mounted which turn the reel, slides through the hollow axis of the wheel 14, by which it is driven, and has a longitudinal groove in its side, into which a stud in the eye of the wheel projects to drive it. The object of this sliding connection of the shaft $o^2$ and wheel 14 is to prevent derangement of the driving-gear when the reel is moved in and out for the purpose of adjustment. The vanes of the reel are placed obliquely to its axis for the purpose of bringing the grain more gradually and with greater regularity into contact with the cutters, and also to press it obliquely against them in a direction contrary to their motion and parallel to the inclination of the indentations formed in their edge, which is found in practice greatly to facilitate the cutting. The grain has a tendency to slip past the hindmost end of the vanes in consequence of their inclination, and thus escape being cut. To prevent the loss of grain and defect in the performance of the machine thus occasioned, I place a wedge or hook, F', upon the end of each vane, in the plane of its motion, which prevents the grain from slipping over it.

The cutter or sickle E consists of a series of short sections of uniform shape, each corresponding in length with and secured to the links of an endless chain, N, by means of screws—bolts or otherwise. By this arrangement each cutter can very readily be removed to be either sharpened, repaired, or replaced by another, and as the cutters form no part of the chain they are not liable to be broken or deranged by the force which is required to overcome the inertia and friction of the chain and of themselves, as that is borne by the chain by which they are carried, so that they have to sustain only the force required to make the cut.

The chain N and sectional cutters E are respectively formed as represented in Fig. 6, each section being narrowest at the end which goes forward, in order that the grain or grass may be the more readily seized and cut off. The edges of the cutters are serrated, in the manner of a sickle, and one end is sharpened in order that it may cut off any straw or other obstruction intervening between it and the plane surface of the adjacent end of the next section. This point I deem of much importance, because it renders the cutters capable of freeing themselves of straw and grass, which otherwise would soon choke and cause them to break. The chain, with its attached cutters, is stretched round a pulley, $o'$, and a cog-wheel, $o$, Fig. 1, the teeth of which take into the interstices between the links, so that when the cog-wheel revolves it carries the chain with it at its own velocity. The wheel and pulley are secured upon vertical axes which turn in suitable bearings attached to the platform or frame. A groove is formed between the upper and under surface of the platform for the chain to run in, to keep it in the proper position, and prevent its yielding to the pressure exerted by the grass or grain against the cutters. I contemplate making the edge of the sectional cutters either smooth or serrated, and also so forming them that when the chain is in a straight line they will either form a straight or a more or less indented edge, as the particular circumstances of the case may render it advisable. It may also be found advisable to make the sections at some distance apart, instead of making them contiguous.

The platform K is double, the upper portion being slotted for the teeth $q$ of the rake to pass through, the head of the rake moving between the top and the bottom.

The rake-head G is placed in a sliding stock, Q, which runs backward and forward on a guide-rod, Q'. The end of the rake-head within the stock has a pinion, $r$, or a segment of one, secured upon it, into which a quadrant-rack, $r'$, takes, which is attached to the end of a lever, $r''$, which turns on a fulcrum on the sliding stock Q, the lever and fulcrum being so arranged that the chains $s'$, which draw the stock and the rake backward and forward, will turn the pinion $r$ each time the motion is reversed far enough to turn the rake-teeth $q$ through an angle of ninety degrees, so as to change them from the vertical to a horizontal position, and vice versa, in order to stand upright to sweep the grain from the first to the second platform, and then again assume a horizontal position to pass beneath the platform to be in position again to rake the cut grain from it. These alternations of the first rake are produced by the two chains $s'$, one end of each of which is attached to the lever $r''$, and the other, after being passed over the pulleys $s''$, is secured to the periphery of the flanged drum S, which is alternated by a rack, $s^3$, which takes into a pinion, $s^4$, upon its axis. The rack $s^3$ is alternated by a pitman, $s^5$, which is moved by a crank-pin, to which it is secured, upon the face of the driving-wheel 5.

The second rake, H, is attached by one end of its head to a cogged quadrant, T, in such a manner that it may be turned upon its own axis at the same time that it is swung through the arc of vibration of the quadrant to carry the grain received from the first rake over the second platform and deposit it behind the latter on the ground. In order that the ends of the teeth may be carried above and placed behind the grain or grass delivered by the first rake upon the second platform, they are turned into a horizontal position when moving forward by a weighted lever, T'', in which position they remain until brought over and behind the grain to be removed by them. The bent arms $t\ t$ upon the inner end of the head, coming against and sliding upon an irregular fixed catch or stop, $u$, Figs. 2, 3, and 5, turn the teeth down again into a vertical position, when the quadrant is reversed in its motion, engaging an arm, T''', which holds up the weighted lever and keeps the rake vertical until it has discharged the grain, when, the quadrant T being reversed, the rake-head comes into contact with the spring $t'$, which offers sufficient resistance to disengage the arm T''' from the catch $t''$, when the weighted lever immediately turns up the teeth again into the horizontal position to prepare them for a repetition of the operation just described. The quadrant T gears into and is alternated by the rack U, which is moved by the pitman U', the latter receiving its motion from the wheel 6, to which it is attached by a wrist-pin or otherwise.

Motion is communicated to the cutter, reel, and rakes from one of the wheels B, which has a cog-wheel, 1, secured to it in any suitable manner, which gears into a pinion, 2, mounted upon the principal driving-shaft $v$, upon which are placed three pinions, 3' 4' 5', of unequal sizes, and having one hollow axis which is common to all, and slides upon the shaft $v$, so that any one of the pinions may be placed into gear with that one of the wheels 3, 4, and 5 upon the second driving-shaft with which it matches. The front wheel, 3, upon the second driving-shaft gears into and drives the wheel 6 and the third driving-shaft upon which it is mounted. Upon the end of this last shaft is placed a crank, which operates the pitman U, that turns the quadrant T, that turns second rake, which crank is so placed as to bring this rake into the proper position to receive the grain brought forward by the first rake immediately after the same has been deposited by it upon the second platform. Upon the front end of the first driving-shaft, $v$, a bevel-wheel, 7, is placed, which takes into a similar wheel, 8, and drives the upright shaft 8', upon which it is mounted. Upon the upper end of the last shaft another bevel-wheel, 9, is placed, which gears into and drives a like wheel, 10, which drives the shaft 10', upon which it is mounted, together with the two wheels 11 and 12. One of the wheels, 11, gears into the wheel 13, which is secured to and drives the shaft 13', upon the opposite end of which is a bevel-wheel, 15, which takes into and drives the wheel 16, which is mounted upon and drives the vertical shaft 16', upon which is the driving-wheel $o$ of the endless chain, to which the cutters are attached. The other wheel, 12, mounted upon the shaft 10', takes into the wheel 14, whose axis is hollow, and is mounted upon the shaft $o^2$, which it drives, the other end of this shaft carrying the wheel 18, which gears into and drives the wheel 19, mounted upon the end of the axis of the reel and turns the same.

The cone of pinions 3' 4' 5' and wheels 3 4 5 are for the purpose of governing the frequency of the alternations of the rakes, so as to make the sheaves of a size corresponding to the growth of the grain.

The train of wheels above described, as well as the other devices employed to give to the cutter, reel, and rakes their requisite movements, may be constructed and arranged as represented, and in various other ways well known to the machinist, and which do not therefore require a particular description. These motions may also be produced by belts or chains and pulleys, instead of gear, if the same should be thought preferable by the constructer. The several parts of the apparatus may be made of such materials as it is deemed best by the constructer to employ.

The operation is analogous to that of other harvesting-machines. The horses being attached to the beam J and the several parts properly adjusted, the conductor mounts the platform M, and, starting the team, advances the machine, guiding it by means of the steering-wheel $b$, which is capable of turning the wheel A, so as to turn the machine entirely around in a very short space. The reel presses the standing grain back against the cutters, which cut it off, letting it fall upon the platform, whence it is taken by the rakes, which remove it with sufficient frequency to render each lot taken off of a suitable quantity for a sheaf.

What I claim as my invention, and desire to secure by Letters Patent, is—

1. The combination of a series of removable cutters with the links of an endless revolving chain, which carries them successively into contact with the grass or grain to be cut, substantially as herein described, whether the cutters be contiguous or placed at intervals upon the chain.

2. Making one end of each cutter sharp, in order that by pressing against the adjacent end of the next cutter straw, grass, or other intervening obstructions may be cut in two and allowed to pass out, the cutters thus freeing themselves from obstructions which might otherwise choke or break them.

3. Placing the bundles or sheaves of grain at right angles to the path of the machine by means of a second rake, H, combined with the first, substantially as herein set forth.

4. Moving or turning the first rake by cords, chains, or belts, arranged and operated as described or in any other substantially-similar manner.

5. Vibrating the second rake, H, and turning its teeth, as herein set forth, whether the devices employed to effect these movements be such as described or others equivalent thereto.

6. Changing the frequency of the alternations of the rakes by means of the cones of wheels 3 4 5 and pinions 3' 4' 5', or other equivalent device, for the purpose of varying the size of the sheaves, as herein set forth.

In testimony whereof I have hereunto set my hand.

NELSON PLATT.

Witnesses:
P. H. WATSON,
S. W. WOOD.